United States Patent
Yang et al.

(10) Patent No.: US 7,151,681 B2
(45) Date of Patent: *Dec. 19, 2006

(54) MULTIPLE-SAMPLING CIRCUIT FOR MEASURING REFLECTED VOLTAGE AND DISCHARGE TIME OF A TRANSFORMER

(75) Inventors: Ta-yung Yang, Milpitas, CA (US); Guo-Kiang Hung, Sindian (TW); Jenn-yu G. Lin, Taipei (TW)

(73) Assignee: System General Corp., Taipei Hsien (TW)

( * ) Notice: Subject to any disclaimer, the term of this patent is extended or adjusted under 35 U.S.C. 154(b) by 45 days.

This patent is subject to a terminal disclaimer.

(21) Appl. No.: 11/022,167

(22) Filed: Dec. 21, 2004

(65) Prior Publication Data

US 2006/0133118 A1    Jun. 22, 2006

(51) Int. Cl.
*H02M 3/335*    (2006.01)
(52) U.S. Cl. .............................. 363/21.13; 363/21.15; 323/282
(58) Field of Classification Search .................. 363/20, 363/21.7, 21.12, 97, 21.13, 21.15; 323/281–282; 327/110, 427
See application file for complete search history.

(56) References Cited

U.S. PATENT DOCUMENTS 4,302,803 A    11/1981    Shelly ........................ 363/20
5,841,643 A *  11/1998    Schenkel ................. 363/21.13

* cited by examiner

*Primary Examiner*—Rajnikant B. Patent
(74) *Attorney, Agent, or Firm*—J.C. Patents (57) ABSTRACT

A multiple-sampling circuit is proposed for measuring a voltage signal and a discharge time of a transformer. Sampling signals are used for generating hold voltages by alternately sampling the reflected voltage from the transformer. A buffer amplifier generates a buffer voltage from the higher voltage of hold voltages. A sampling switch periodically conducts the buffer voltage to produce a voltage-feedback signal. The voltage-feedback signal is proportional to an output voltage of the switching circuit. A threshold signal added to the reflected voltage signal produces a level-shift reflected signal. A discharge-time signal is generated as the switching signal is disabled. The discharge-time signal is disabled once the level-shift signal is lower than the voltage-feedback signal. The pulse width of the discharge-time signal is therefore correlated to the discharge time of the transformer. The sampling signals are enabled to generate hold voltages only when the discharge-time signal is enabled.

9 Claims, 10 Drawing Sheets

MULTIPLE-SAMPLING CIRCUIT FOR MEASURING REFLECTED VOLTAGE AND DISCHARGE TIME OF A TRANSFORMER

BACKGROUND OF THE INVENTION

1. Field of the Invention

The present invention relates to a control circuit for a power supply, and more specifically relates to a switching controller for a switching mode power supply.

2. Description of Related Art

Power supplies have been widely used to provide regulated output voltages. For safety, an off-line power supply must provide galvanic isolation between its primary side and secondary side. An optical-coupler and a secondary-side regulator are needed to regulate the output voltage of the off-line power supply. In order to reduce the device counts and do without a secondary-side feedback circuit, a primary-side control technique has been disclosed in U.S. Pat. No. 4,302,803 "Rectifier-Converter Power Supply with Multi-Channel Flyback Inverter", issued to Randolph D. W. Shelly. However, foregoing prior art cannot measure an accuracy voltage signal from the transformer. This shortcoming is the main object of the present invention to overcome.

SUMMARY OF THE INVENTION

An object of the present invention is to provide a precise sampling circuit in a switching controller of a power supply to measure a voltage signal and a discharge time of a transformer. An output voltage and an output current are regulated without an optical-coupler and a secondary-side regulator. In addition, the discharge time of the transformer is an important factor for quasi-resonant power converters to synchronize with the valley voltage and achieve soft switching.

A multiple-sampling circuit for the switching controller of the power supply is connected to an auxiliary winding of the transformer, a PWM (pulse width modulation)-and-blanking unit, and an oscillating unit. The multiple-sampling circuit comprises a time-delay unit connected to the PWM-and-blanking unit for receiving a switching signal to generate an inverse switching signal via an inverter of the time-delay unit. The time-delay unit further generates a delay-time signal when the switching signal is disabled.

The multiple-sampling circuit further comprises a signal-generating unit connected to the time-delay unit for receiving the delay-time signal, the inverse switching signal, and a reflected voltage signal. The reflected voltage signal is obtained from the auxiliary winding of the transformer via a voltage divider connected to the transformer. The signal-generating unit generates a discharge-time signal, a first sampling signal and a second sampling signal.

The multiple-sampling circuit further comprises a sampling unit connected to the voltage divider, the oscillating unit, the PWM-and-blanking unit, and the signal-generating unit. The sampling unit generates a voltage-feedback signal by receiving the first sampling signal, the second sampling signal, the reflected voltage signal, a pulse signal generated by the oscillating unit, a clear signal generated by the PWM-and-blanking unit. The first sampling signal and the second sampling signal alternately control the sampling unit to sample the reflected voltage signal and therefore generate the voltage-feedback signal.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

FIG. 2A shows the signal flow of the switching circuit as a power switch is turned on.

DESCRIPTION OF THE PREFERRED EMBODIMENTS

Figure 1:
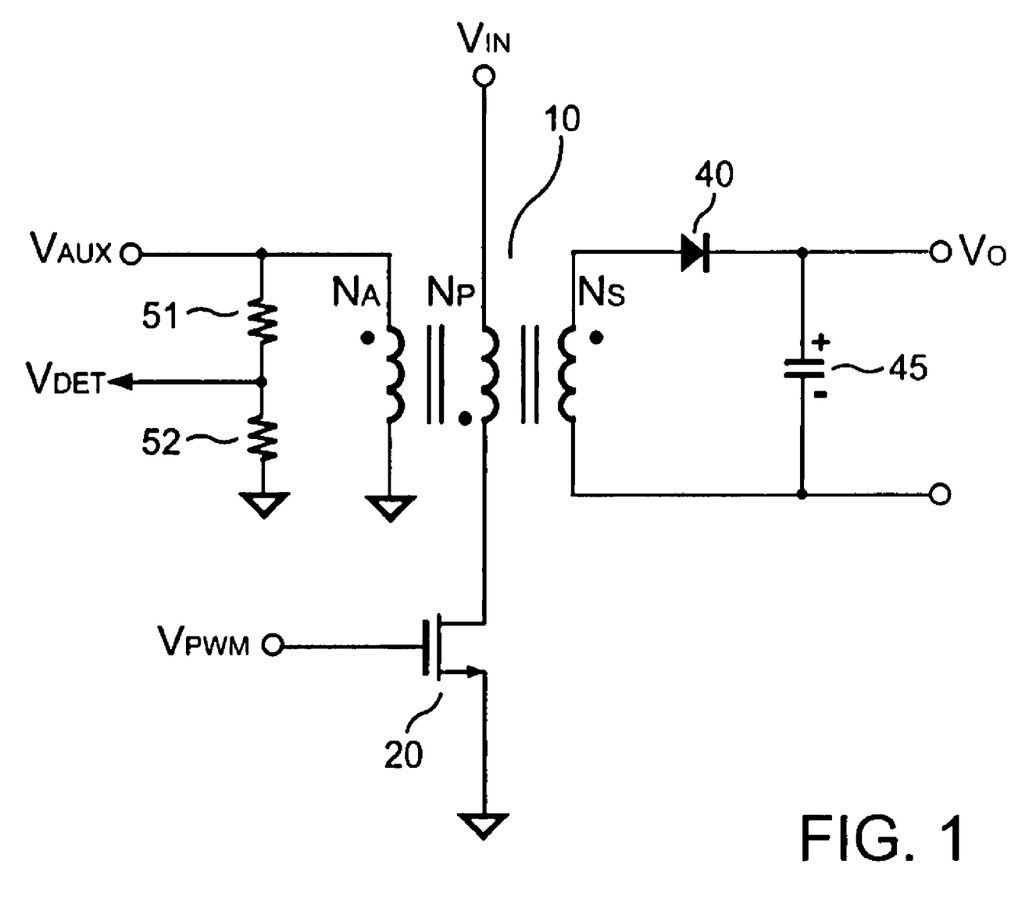
FIG. 1 shows a schematic diagram of a switching circuit.

FIG. 1 shows a switching circuit, comprising a transformer 10 having an auxiliary winding $N_A$, a primary winding $N_P$, and a secondary winding $N_S$. The primary winding $N_P$ is coupled to an input voltage $V_{IN}$. A voltage divider formed by resistors 51 and 52 is connected to the auxiliary winding $N_A$ for obtaining a reflected voltage signal $V_{DET}$ from a voltage signal $V_{AUX}$ at the auxiliary winding $N_A$. In order to regulate an output voltage $V_O$ and an output current $I_O$ of the switching circuit, a switching signal $V_{PWM}$ switches the transformer 10 via a switch, such as a transistor 20.

Figure 2A:
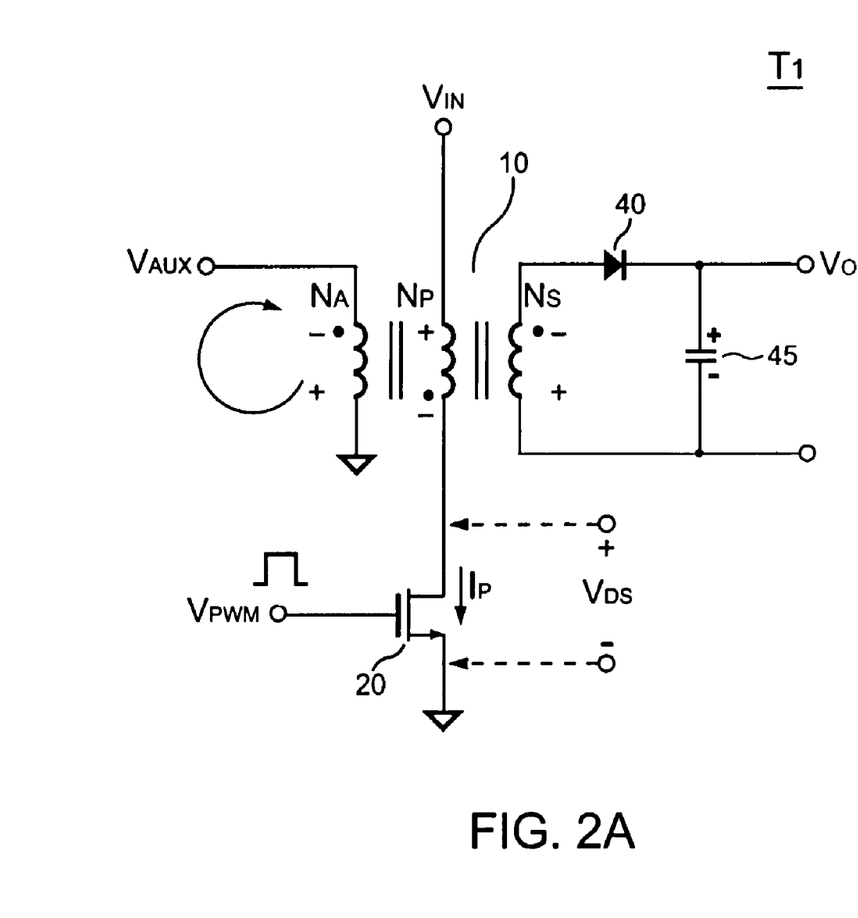
Figure 3:
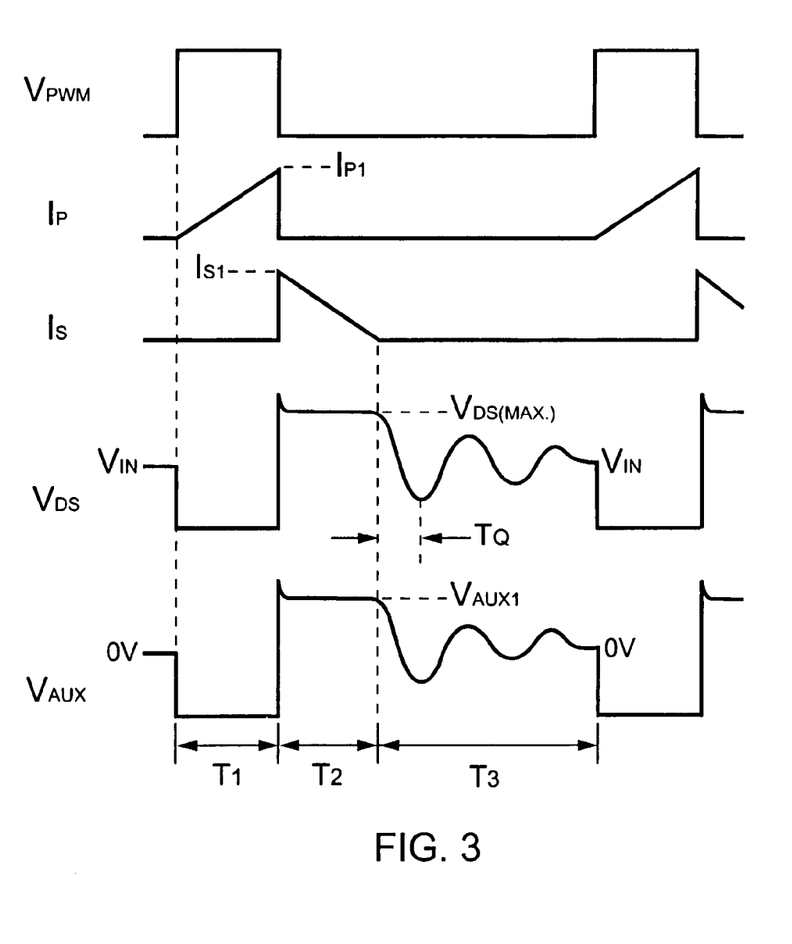
FIG. 3 shows various waveforms of the switching circuit in each switching cycle.

Referring to FIG. 1 and FIG. 2A, when the switching signal $V_{PWM}$ becomes on (logic-high), a primary-side switching current $I_P$ is generated accordingly to store energy into the transformer 10. Various waveforms in the switching circuit in this stage are shown during a period $T_1$ in FIG. 3. A peak value $I_{P1}$ of the primary-side switching current $I_P$ can be given by, $$I_{P1} = \frac{V_{IN}}{L_P} \times T_{ON} \qquad (1)$$

where $L_P$ is the inductance of the primary winding $N_P$ of the transformer 10; $T_{ON}$ is an on-time of the switching signal $V_{PWM}$.

Figure 2B:
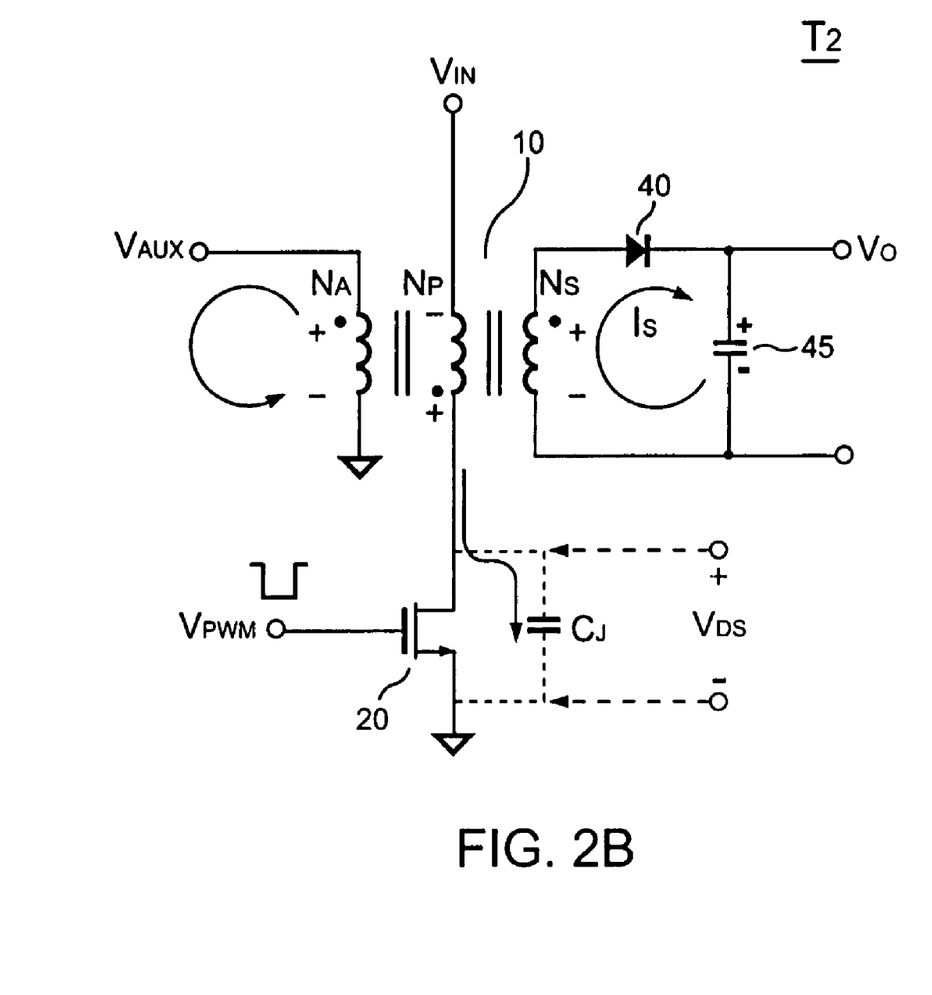
FIG. 2B shows the signal flow of the switching circuit as the power switch is turned off.

Referring to FIG. 1 and FIG. 2B, when the switching signal $V_{PWM}$ becomes off (logic-low), the energy stored in the transformer 10 is delivered to the secondary side of the transformer 10 and to an output of the switching circuit via a rectifier 40. A secondary-side switching current $I_S$ is generated accordingly. Various waveforms in this stage are shown during a period $T_2$ in FIG. 3. A peak value $I_{S1}$ of the secondary-side switching current $I_S$ can be given by, $$I_{S1} = \frac{(V_O + V_F)}{L_S} \times T_{DS} \quad (2)$$

where $V_O$ is the output voltage of the switching circuit; $V_F$ is a forward voltage drop of the rectifier 40; $L_S$ is the inductance of the secondary winding $N_S$ of the transformer 10; $T_{DS}$ is a discharge time of the transformer 10, which also represents a discharge time of the secondary-side switching current Is.

Meanwhile, the voltage signal $V_{AUX}$ is generated at the auxiliary winding $N_A$ of the transformer 10. A voltage signal $V_{AUX1}$ as shown in FIG. 3 is given by, $$V_{AUX1} = \frac{T_{NA}}{T_{NS}} \times (V_O + V_F) \quad (3)$$

Meanwhile, the energy stored in the transformer 10 will charge a parasitic capacitor $C_J$ of the transistor 20 to generate a voltage $V_{DS}$ across the parasitic capacitor $C_J$ of the transistor 20. The voltage $V_{DS}$ is given by, $$V_{DS} = V_{IN} + \left[\frac{T_{NP}}{T_{NS}} \times (V_O + V_F)\right] \quad (4)$$

where $V_{IN}$ is the input voltage of the switching circuit; $T_{NA}$, $T_{NP}$ and $T_{NS}$ are respectively the winding turns of the auxiliary winding $N_A$, the primary winding $N_P$ and the secondary winding $N_S$ of the transformer 10.

Figure 2C:
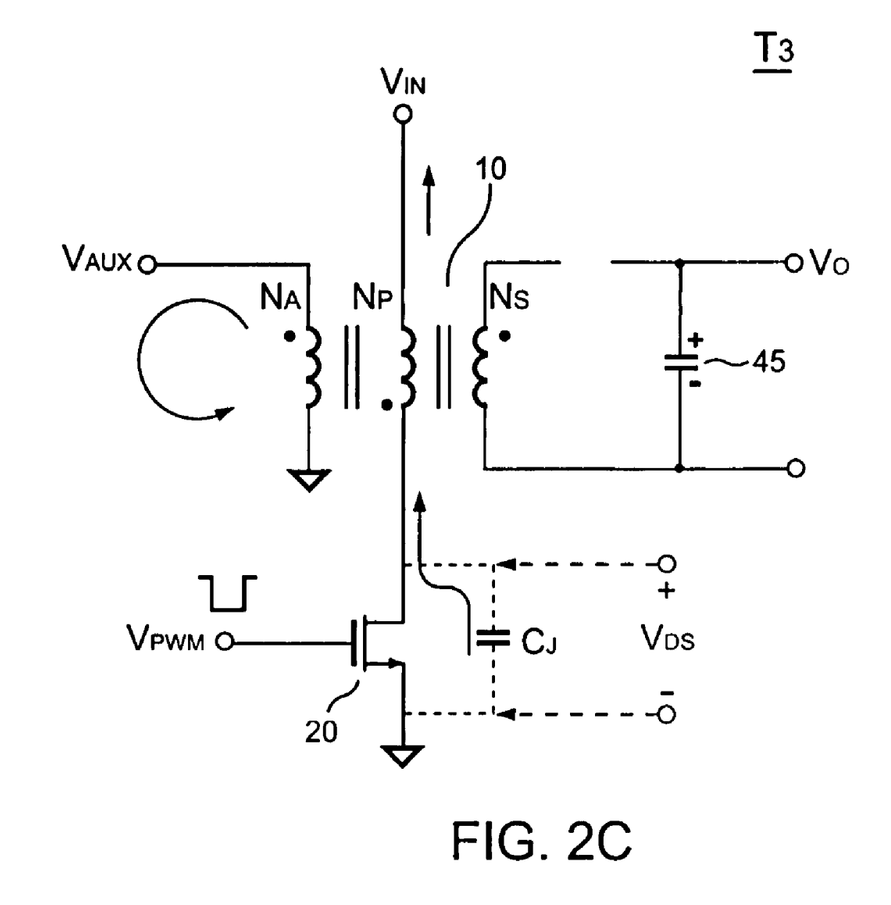
FIG. 2C shows the signal flow of the switching circuit as the power switch is turned off.

Referring to FIG. 1 and FIG. 2C, when the energy stored in the transformer 10 is fully released, the secondary-side switching current $I_S$ will fall to zero. In the meantime, since the voltage $V_{DS}$ is higher than the input voltage $V_{IN}$, the voltage $V_{DS}$ will start to charge back to the input voltage $V_{IN}$. Various waveforms in this stage are shown during a period $T_3$ in FIG. 3. The voltage $V_{DS}$ will decrease to a valley voltage during a period $T_Q$. The slew rate of the decrease of the voltage $V_{DS}$ is determined by a resonant frequency $f_R$. The resonant frequency $f_R$ and the period $T_Q$ are respectively given by equations (5) and (6).

$$f_R = \frac{1}{2\pi\sqrt{L_P \times C_J}} \quad (5)$$

$$T_Q = \frac{1}{(4 \times f_R)}$$

$$T_Q = \frac{\pi\sqrt{L_P \times C_J}}{2} \quad (6)$$

where $C_J$ is the capacitance of the parasitic capacitor of the transistor 20.

The voltage signal $V_{AUX}$ will start to decrease as the voltage $V_{DS}$ starts to decrease. The voltage signal $V_{AUX}$ is correlated with the voltage $V_{DS}$, which can be given by, $$V_{AUX} = \frac{T_{NA}}{T_{NP}} \times (V_{DS} - V_{IN}) \quad (7)$$

Figure 6:
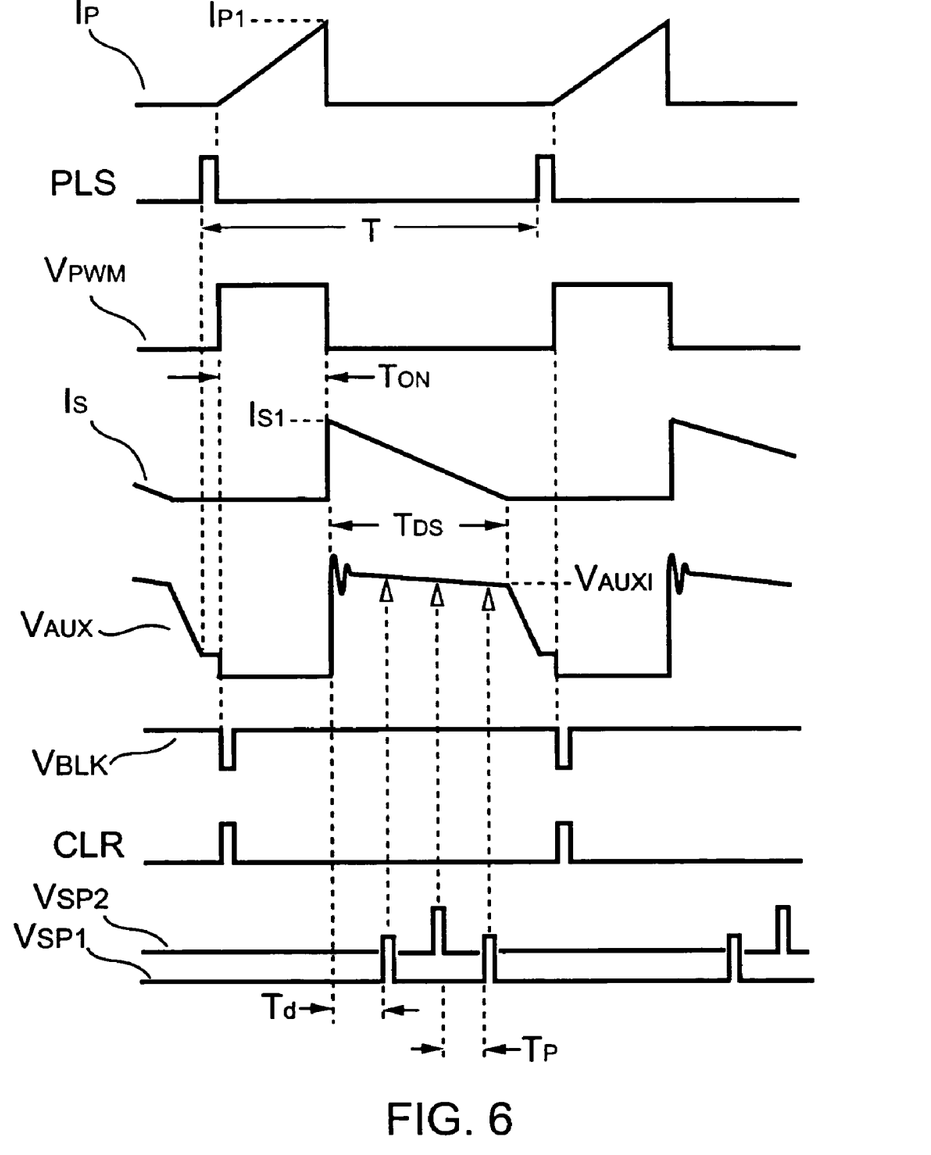
FIG. 6 shows the key waveforms of the multiple-sampling circuit of the present invention.

Therefore, as shown in FIG. 6, the discharge time $T_{DS}$ in equation (2) can be measured from the falling edge of the switching signal $V_{PWM}$ to the falling corner of the voltage signal $V_{AUX}$.

Referring to FIG. 1, the resistors 51 and 52 form the voltage divider connected between the auxiliary winding $N_A$ of the transformer 10 and a ground reference to generate a reflected voltage signal $V_{DET}$, which is given by, $$V_{DET} = \frac{R_{52}}{R_{51} + R_{52}} \times V_{AUX} \quad (8)$$

where $R_{51}$ and $R_{52}$ are respectively the resistance of the resistors 51 and 52.

Figure 4:
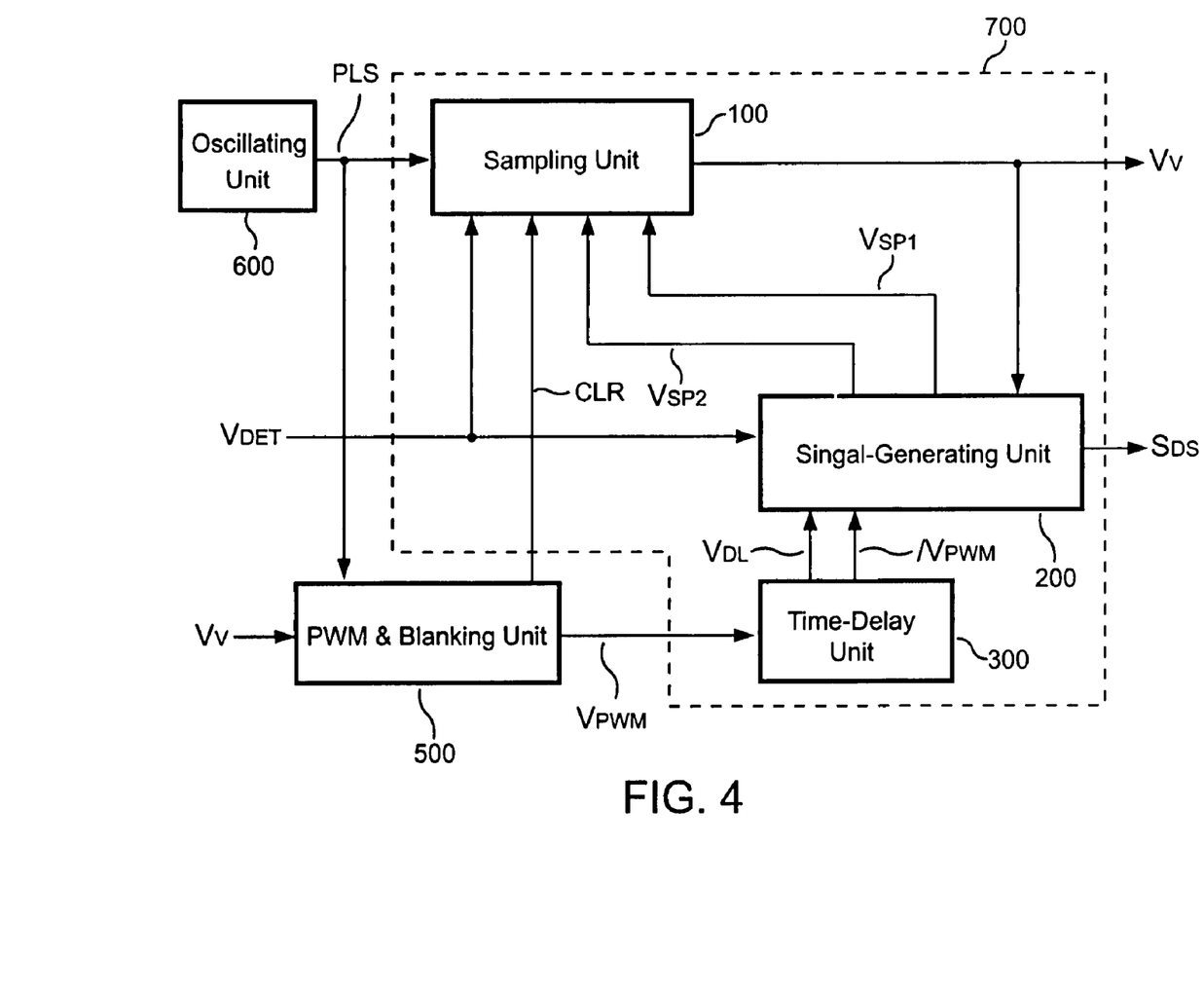
FIG. 4 shows a block diagram of a multiple-sampling circuit of the present invention.

FIG. 4 shows a multiple-sampling circuit 700 of the present invention. The multiple-sampling circuit 700 is connected to a PWM-and-blanking unit 500, an oscillating unit 600, and the auxiliary winding $N_A$ of the transformer 10 via the voltage divider. The multiple-sampling circuit 700 includes a sampling unit 100, a signal-generating unit 200 and a time-delay unit 300.

Further referring to FIG. 4, the time-delay unit 300 is connected to the PWM-and-blanking unit 500 for receiving the switching signal $V_{PWM}$. The time-delay unit 300 generates an inverse switching signal $/V_{PWM}$ via an inverter of the time-delay unit 300. The time-delay unit 300 further generates a delay-time signal $V_{DL}$ as the switching signal $V_{PWM}$ is disabled. The signal-generating unit 200 is connected to the time-delay unit 300 for receiving the delay-time signal $V_{DL}$, the inverse switching signal $/V_{PWM}$, and the reflected voltage signal $V_{DET}$. The signal-generating unit 200 generates a discharge-time signal $S_{DS}$, a first sampling signal $V_{SP1}$, and a second sampling signal $V_{SP2}$. The sampling unit 100 is connected to the oscillating unit 600, the PWM-and-blanking unit 500, and the signal-generating unit 200 for receiving the first sampling signal $V_{SP1}$, the second sampling signal $V_{SP2}$, the reflected voltage signal $V_{DET}$, a pulse signal PLS generated by the oscillating unit 600, and a clear signal CLR generated by the PWM-and-blanking unit 500. The first sampling signal $V_{SP1}$ and the second sampling signal $V_{SP2}$ alternately control the sampling unit 100 to sample the reflected voltage signal $V_{DET}$ and therefore generate the voltage-feedback signal $V_V$.

The main object of the present invention is to provide a precise sampling circuit for measuring the voltage signal and the discharge time of the transformer of the switching circuit. In addition, the present invention can regulate an output voltage and an output current without an optical-coupler and a secondary-side regulator.

Figure 5:
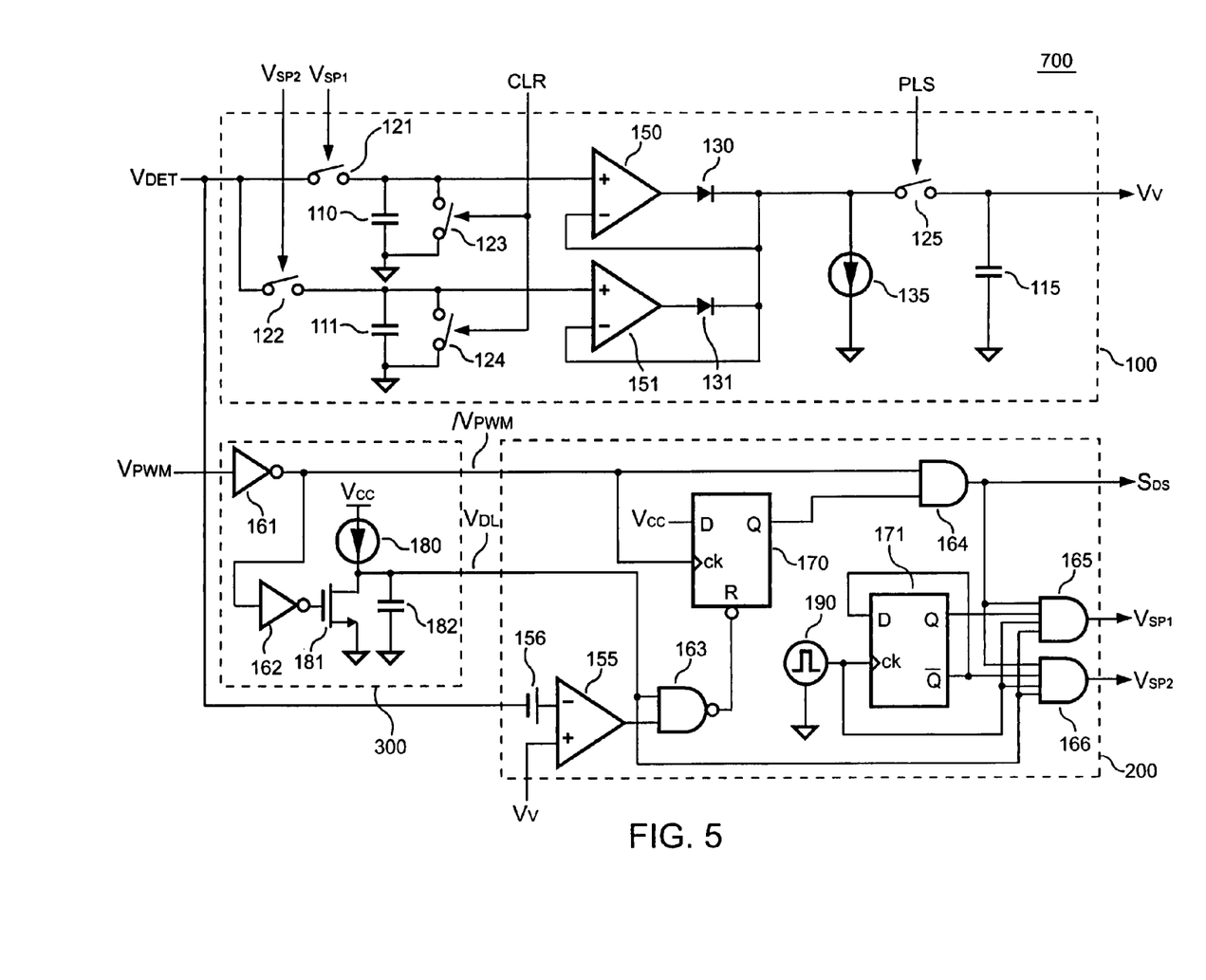
FIG. 5 shows the multiple-sampling circuit according to an embodiment of the present invention.

Referring FIG. 1 and FIG. 5, the multiple-sampling circuit 700 according to a preferred embodiment of the present invention is illustrated. The voltage-feedback signal $V_V$ and the discharge-time signal $S_{DS}$ are generated by multiple-sampling the reflected voltage signal $V_{DET}$. The voltage-feedback signal $V_V$ is in precise proportion to the output voltage $V_O$. The discharge-time signal $S_{DS}$ represents the discharge time $T_{DS}$ of the secondary-side switching current $I_S$. Before the secondary-side switching current $I_S$ falls to zero, the reflected voltage signal $V_{DET}$ is sampled and measured. Therefore, the variation of the secondary-side switching current $I_S$ will not affect the forward voltage drop $V_F$ of the rectifier 40.

The signal-generating unit 200 includes a first signal generator, a second signal generator, a threshold signal 156, and a pulse generator 190. The pulse generator 190 generates a sampling-pulse signal for multiple-sampling operation. The threshold signal 156 added to the reflected voltage signal $V_{DET}$ generates a level-shift reflected signal. The first signal generator comprises a D flip-flop 171, an AND gate 165 and an AND gate 166 for generating the first sampling signal $V_{SP1}$, and the second sampling signal $V_{SP2}$. The second signal generator comprises a D flip-flop 170, a NAND gate 163, an AND gate 164 and a comparator 155 for generating the discharge-time signal $S_{DS}$.

Further referring to FIG. 5 and FIG. 6, the time-delay unit 300 includes an inverter 161, an inverter 162, a current source 180, a transistor 181 and a capacitor 182 for generating a delay time $T_d$ as the switching signal $V_{PWM}$ is disabled. An input of an inverter 161 is supplied with the switching signal $V_{PWM}$. An output of the inverter 161 is connected to an input of the inverter 162, a first input of the AND gate 164 and a clock-input of the D flip-flop 170. An output of the inverter 162 turns on/off the transistor 181. The capacitor 182 is connected in parallel with the transistor 181. The current source 180 is applied to charge the capacitor 182. Therefore the current of the current source 180 and the capacitance of the capacitor 182 decide the delay time $T_d$ of the time-delay unit 300. The capacitor 182 further generates the delay-time signal $V_{DL}$.

A D-input of the D flip-flop 170 is pulled high by a supply voltage $V_{CC}$. An output of the D flip-flop 170 is connected to a second input of the AND gate 164. The AND gate 164 outputs the discharge-time signal $S_{DS}$. The discharge-time signal $S_{DS}$ is thus enabled as the switching signal $V_{PWM}$ is disabled. An output of the NAND gate 163 is connected to a reset-input of the D flip-flop 170. A first input of the NAND gate 163 is connected to the capacitor 182 for receiving the delay-time signal $V_{DL}$. A second input of the NAND gate 163 is connected to an output of the comparator 155. The level-shift reflected signal is supplied to a negative input of the comparator 155. A positive input of the comparator 155 is supplied with the voltage-feedback signal $V_V$. Therefore, after the delay time $T_d$, the discharge-time signal $S_{DS}$ can be disabled once the level-shift reflected signal is lower than the voltage-feedback signal $V_V$. Besides, the discharge-time signal $S_{DS}$ can also be disabled as the switching signal $V_{PWM}$ is enabled.

The sampling-pulse signal is supplied to a clock-input of the D flip-flop 171 and third inputs of AND gates 165 and 166. A D-input and an inverse output of the D flip-flop 171 are connected together to form a divided-by-two counter. An output and the inverse output of the D flip-flop 171 are respectively connected to second inputs of AND gates 165 and 166. First inputs of AND gates 165 and 166 are supplied with the discharge-time signal $S_{DS}$. Fourth inputs of AND gates 165 and 166 are supplied with the delay-time signal $V_{DL}$. Therefore the first sampling signal $V_{SP1}$ and the second sampling signal $V_{SP2}$ are alternately generated in response to the sampling-pulse signal. Besides, the first sampling signal $V_{SP1}$ and the second sampling signal $V_{SP2}$ are alternately produced during an enabled period of the discharge-time signal $S_{DS}$. However, the delay time $T_d$ is inserted at the beginning of the discharge-time signal $S_{DS}$ to inhibit the first sampling signal $V_{SP1}$ and the second sampling signal $V_{SP2}$.

The first sampling signal $V_{SP1}$ and the second sampling signal $V_{SP2}$ are thus disabled during the period of the delay time $T_d$.

The first sampling signal $V_{SP1}$ and the second sampling signal $V_{SP2}$ are used for alternately sampling the reflected voltage signal $V_{DET}$. The first sampling signal $V_{SP1}$ and the second sampling signal $V_{SP2}$ control a switch 121 and a switch 122 for obtaining a first hold voltage and a second hold voltage across a capacitor 110 and a capacitor 111, respectively. A switch 123 is connected in parallel with the capacitor 110 to discharge the capacitor 110. A switch 124 is connected in parallel with the capacitor 111 to discharge the capacitor 111.

A buffer amplifier of the sampling unit 100 includes operational amplifiers 150, 151, diodes 130, 131, and a current source 135 for generating a buffer voltage. The positive inputs of operational amplifiers 150 and 151 are connected to the capacitor 110 and capacitor 111, respectively. The negative inputs of the operational amplifiers 150 and 151 are connected to an output of the buffer amplifier. The diode 130 is connected from an output of the operational amplifier 150 to the output of the buffer amplifier. The diode 131 is connected from an output of the operational amplifier 151 to the output of the buffer amplifier. The buffer voltage is thus obtained from the higher voltage of the first hold voltage and the second hold voltage. The current source 135 is used for termination. A switch 125, which is turned on/off by the pulse signal PLS, is connected to the buffer amplifier. The switch 125 periodically conducts the buffer voltage to a capacitor 115 for producing the voltage-feedback signal $V_V$. Therefore the voltage-feedback signal $V_V$ is proportional to the output voltage $V_O$ of the switching circuit. The first sampling signal $V_{SP1}$ and the second sampling signal $V_{SP2}$ start to produce the first hold voltage and the second hold voltage after the delay time $T_d$. This could eliminate the spike interference of the voltage signal $V_{AUX}$. The spike of the voltage signal $V_{AUX}$ would be generated when the switching signal $V_{PWM}$ is disabled and the transistor 20 is turned off.

Referring to FIG. 6, the voltage signal $V_{AUX}$ starts to decrease as the secondary-side switching current $I_S$ falls to zero, which will be detected by the comparator 155 for disabling the discharge-time signal $S_{DS}$. The pulse width of the discharge-time signal $S_{DS}$ is therefore correlated to the discharge time $T_{DS}$ of the secondary-side switching current $I_S$. Meanwhile the first sampling signal $V_{SP1}$ and the second sampling signal $V_{SP2}$ are disabled, and the multiple-sampling operation is stop as the discharge-time signal $S_{DS}$ is disabled. At the moment, the buffer voltage generated at the output of the buffer amplifier represents an end voltage. The end voltage is thus correlated to the voltage signal $V_{AUX}$ that is sampled just before the secondary-side switching current $I_S$ falls to zero. The buffer voltage is obtained from the higher voltage of the first hold voltage and the second hold voltage, which will ignore the voltage that is sampled when the voltage signal $V_{AUX}$ has started to decrease.

Besides, once the switching signal $V_{PWM}$ is enabled, a minimum on-time of the switching signal $V_{PWM}$ will be ensured. The minimum on-time $T_{ON}$ of the switching signal $V_{PWM}$ further ensures a minimum discharge time $T_{DS}$, which ensures a proper multiple-sampling operation for sampling the voltage signal $V_{AUX}$ in the multiple-sampling circuit 700. The discharge time $T_{DS}$ is related to the on-time $T_{ON}$ of the switching signal $V_{PWM}$. Referring to equations (1), (2), (3) and the secondary inductance $L_S$, which is given by equation (9), the discharge time $T_{DS}$ can be expressed by equation (10).

$$L_S = \left(\frac{T_{NS}}{T_{NP}}\right)^2 \times L_P \qquad (9)$$

$$T_{DS} = \left(\frac{V_{IN}}{V_O + V_F}\right) \times \frac{T_{NS}}{T_{NP}} \times T_{ON} \qquad (10)$$

Figure 7:
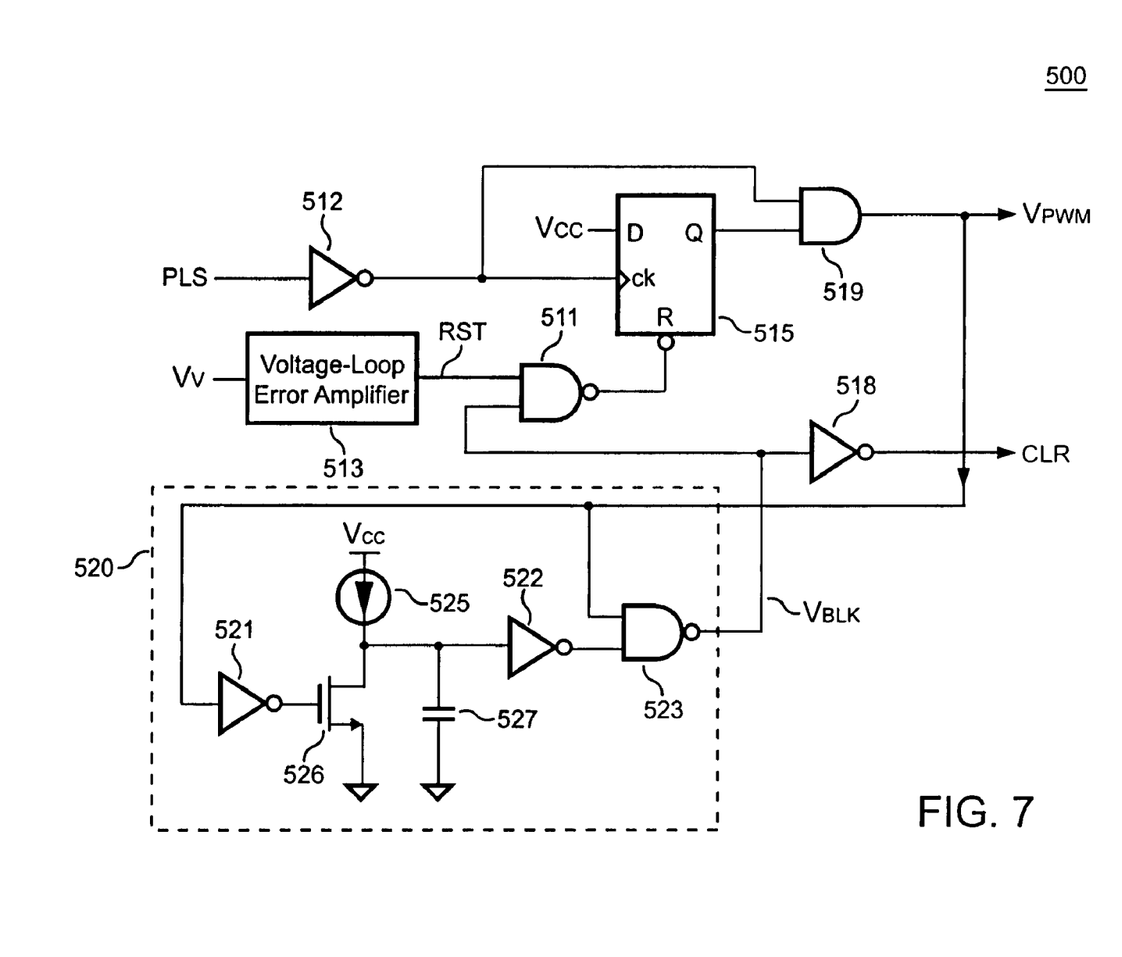
FIG. 7 shows a PWM-and-blanking unit according to an embodiment of the present invention.

FIG. 7 shows the PWM-and-blanking unit 500 according to a preferred embodiment of the present invention. The PWM-and-blanking unit 500 includes a PWM circuit and a blanking circuit 520. The PWM circuit comprises a NAND gate 511, a D flip-flop 515, an AND gate 519, an inverter 512, an inverter 518, and a voltage-loop error amplifier 513. Referring to FIG. 4 and FIG. 6, the inverter 512 is connected to the oscillating unit 600 for receiving the pulse signal PLS. An output of the inverter 512 is connected to a clock-input of the D flip-flop 515 for enabling the switching signal $V_{PWM}$. A D-input of the D flip-flop 515 is pulled high by the supply voltage $V_{CC}$. An output of the D flip-flop 515 is connected to a first input of the AND gate 519. A second input of the AND gate 519 is connected to the output of the inverter 512. The switching signal $V_{PWM}$ is generated by the AND gate 519. A reset input of the D flip-flop 515 is connected to an output of the NAND gate 511. A first input of the NAND gate 511 is supplied with a reset signal RST to cycle-by-cycle turn off the switching signal $V_{PWM}$. The voltage-loop error amplifier 513 generates the reset signal RST in response to the voltage-feedback signal $V_V$. A second input of the NAND gate 511 is connected to an output of the blanking circuit 520 for receiving a blanking signal $V_{BLK}$.

Referring to FIG. 7, the blanking circuit 520 includes NAND gate 523, a current source 525, a transistor 526, an inverter 521 and an inverter 522. The switching signal $V_{PWM}$ supplies an input of the inverter 521 and a first input of the NAND gate 523. An output of the inverter 521 turns on/off the transistor 526. An output of the inverter 522 is connected to a second input of the NAND gate 523. The current of the current source 525 and the capacitance of the capacitor 527 determine the pulse width of the blanking signal $V_{BLK}$. The inverter 518 receives the blanking signal $V_{BLK}$ and generates the clear signal CLR. Referring to FIG. 6, the clear signal CLR and the blanking signal $V_{BLK}$ are reciprocally inverse. The clear signal CLR turns on/off the switches 123 and 124. As the switching signal $V_{PWM}$ is enabled, the blanking circuit 520 outputs the blanking signal $V_{BLK}$ to disable the $V_{PWM}$ to avoid the D flip-flop 515 being reset.

Since the voltage signal $V_{AUX}$ is reflected from the transformer 10 as the switching signal $V_{PWM}$ is off. Therefore, the switching signal $V_{PWM}$ must maintain a minimum switching frequency to ensure a switching of the transformer 10 for multiple sampling the voltage signal $V_{AUX}$.

Figure 8:
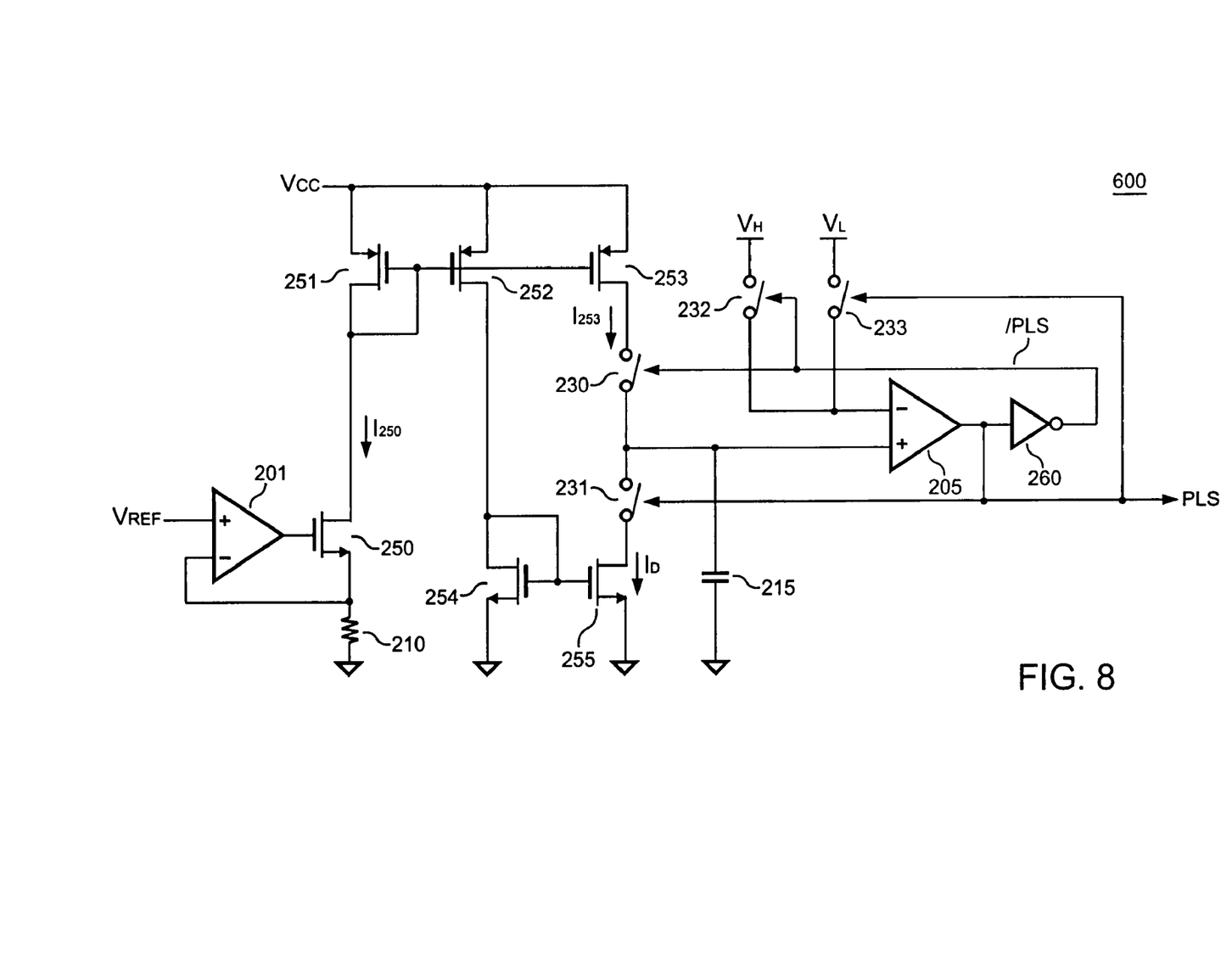
FIG. 8 shows an oscillating unit according to an embodiment of the present invention.

FIG. 8 shows the oscillating unit 600 according to an embodiment of the present invention. An operational amplifier 201, a resistor 210 and a transistor 250 form a first V-to-I converter. The first V-to-I converter generates a reference current $I_{250}$ in response to a reference voltage $V_{REF}$. A plurality of transistors, such as 251, 252, 253, 254 and 255 form current mirrors for generating a charge current $I_{253}$ and a discharge current $I_D$ in response to the reference current $I_{250}$. A first switch 230 is connected between a drain of the transistor 253 and a capacitor 215. A second switch 231 is connected between the capacitor 215 and a drain of transistor 255. A first comparator 205 generates the pulse signal PLS to determine the switching frequency. A first terminal of a third switch 232 is supplied with a high-threshold voltage $V_H$. A first terminal of a fourth switch 233 is supplied with a low-threshold voltage $V_L$. A second terminal of the third switch 232 and a second terminal of the fourth switch 233 are connected to a negative terminal of the comparator 205. An input of an inverter 260 is connected to an output of the comparator 205. An output of the inverter 260 generates an inverse pulse signal /PLS. The pulse signal PLS turns on/off the second switch 231 and the fourth switch 233. The inverse pulse signal /PLS turns on/off the first switch 230 and the third switch 232.

As described above, the present invention provides a precise multiple-sampling circuit in a switching controller for power supplies. The multiple-sampling circuit is capable of measuring the voltage signal and the discharge time of the transformer without optical-coupler and secondary-side regulator to regulate an output voltage and an output current of the power supply.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A multiple-sampling circuit applied in a switching controller for power supplies, connected to an auxiliary winding of a transformer, a PWM (pulse width modulation)-and-blanking unit, and an oscillating unit; said multiple-sampling circuit comprising:

a time-delay unit, connected to said PWM-and-blanking unit for receiving a switching signal, said time-delay unit generating a delay-time signal as said switching signal is disabled, said time-delay unit also generating an inverse switching signal via an inverter, wherein said switching signal is used to switch said transformer via a power switch;

a signal-generating unit, connected to said time-delay unit for receiving said delay-time signal and said inverse switching signal; said signal-generating unit also receiving a reflected voltage signal from said auxiliary winding of said transformer via a voltage divider; said signal-generating unit generating a discharge-time signal, a first sampling signal and a second sampling signal; and a sampling unit, connected to said voltage divider, said oscillating unit, and said PWM-and-blanking unit for receiving said first sampling signal, said second sampling signal, said reflected voltage signal, a pulse signal generated by said oscillating unit, and a clear signal generated by said PWM-and-blanking unit; said sampling unit being controlled by said first sampling signal and said second sampling signal to sample said reflected voltage signal for generating a voltage-feedback signal.

2. The multiple-sampling circuit as claimed in claim 1, said signal-generating unit comprising a threshold signal, wherein said threshold signal added to said reflected voltage signal to generate a level-shift reflected signal, wherein said discharge-time signal is generated as said switching signal is disabled, wherein said discharge-time signal is disabled as said level-shift reflected voltage signal is lower than said voltage-feedback signal, wherein a pulse width of said discharge-time signal is correlated to a discharge time of said transformer.

3. The multiple-sampling circuit as claimed in claim 1, said signal-generating unit further comprising:
- a sampling-pulse generator, generating a sampling-pulse signal for multiple-sampling operation;
- a first signal generator, alternately generating said first sampling signal and said second sampling signal in response to said sampling-pulse signal during an enabled period of said discharge-time signal; wherein a delay time is inserted at the beginning of said discharge-time signal; wherein said first sampling signal and said second sampling signal are disabled during an period of said delay time; and
- a second signal generator, for generating said discharge-time signal; wherein said discharge-time signal is enabled as said switching signal is disabled; wherein after said delay time, said discharge-time signal is disabled as said level-shift reflected signal is lower than said voltage-feedback signal; wherein said discharge-time signal can also be disabled as said switching signal is enabled.

4. The multiple-sampling circuit as claimed in claim 1, said first sampling signal and said second sampling signal alternately controlling two switches to sample said reflected voltage signal for respectively obtaining a first hold voltage across a first capacitor and a second hold voltage across a second capacitor.

5. The multiple-sampling circuit as claimed in claim 1, said sampling unit comprising a buffer amplifier connected to said first capacitor and said second capacitor for receiving said first hold voltage and said second hold voltage, wherein a buffer voltage is obtained from the higher voltage of said first hold voltage and said second hold voltage.

6. The multiple-sampling circuit as claimed in claim 3, said sampling unit further comprising a sampling switch connected to said buffer amplifier, said sampling switch being cycle-by-cycle controlled by said pulse signal to conduct said buffer voltage to an output capacitor for generating said voltage-feedback signal.

7. The multiple-sampling circuit as claimed in claim 1, wherein an end voltage is generated by multiple sampling said reflected voltage signal, said end voltage being measured before a secondary-side switching current falls to zero.

8. The multiple-sampling circuit as claimed in claim 1, wherein said switching signal has a minimum on-time, wherein once said switching signal is enabled, said minimum on-time ensures a minimum discharge time for multiple sampling said reflected voltage signal.

9. The multiple-sampling circuit as claimed in claim 1, wherein said switching signal has a minimum switching frequency to ensure a switching of said transformer for multiple sampling said reflected voltage signal.

* * * * *